United States Patent [19]

Kang et al.

[11] Patent Number: 4,985,261
[45] Date of Patent: Jan. 15, 1991

[54] PROCESS FOR MICROWAVE BROWNING PROTEINACEOUS FIBROUS MEAT PRODUCTS

[75] Inventors: Young C. Kang, Oakhurst; Chee-Teck Tan, Middletown; Brian Byrne, East Brunswick; Lawrence L. Buckholz, Jr, Middletown; Marion A. Sudol, Boonton; Richard M. Boden, Ocean, all of N.J.

[73] Assignee: International Flavors & Fragrances Inc., New York, N.Y.

[21] Appl. No.: 535,524

[22] Filed: Jun. 8, 1990

Related U.S. Application Data

[60] Continuation-in-part of Ser. No. 440,794, Nov. 24, 1989, Pat. No. 4,943,697, Ser. No. 166,062, Mar. 9, 1988, Pat. No. 4,795,649 which is a division of Ser. No. 356,503, May 25, 1989, which is a division of Ser. No. 295,450, Jan. 10, 1989, Pat. No. 4,882,184.

[51] Int. Cl.$^5$ .............................................. A23L 1/00
[52] U.S. Cl. ................................... 426/243; 426/262; 426/296; 426/641
[58] Field of Search ............... 426/243, 262, 305, 641, 426/99, 296; 219/10.55 M

[56] References Cited

U.S. PATENT DOCUMENTS

| | | | |
|---|---|---|---|
| 3,256,101 | 6/1966 | Arns | 99/221 |
| 3,949,094 | 4/1974 | Johnson et al. | 426/99 |
| 4,316,070 | 2/1982 | Prosise et al. | 219/10.55 E |
| 4,448,791 | 5/1984 | Fulde et al. | 426/243 |
| 4,518,618 | 5/1985 | Hsia et al. | 426/262 |
| 4,735,812 | 8/1988 | Bryson et al. | 426/262 |
| 4,857,340 | 8/1989 | Parliment et al. | 426/107 |
| 4,882,184 | 11/1989 | Buckholz et al. | 426/243 |

OTHER PUBLICATIONS

Copson et al., "Browning Methods in Microwave Cooking", Agricultural and Food Chemistry, vol. 3, No. 5, May 1955 (pp. 424–427).

Primary Examiner—George Yeung
Attorney, Agent, or Firm—Arthur L. Liberman

[57] ABSTRACT

Described is a process for producing a cooked edibly browned storage-stable fibrous proteinaceous muscle tissue foodstuff including the steps of:

(a) providing a particulate flowable flavoring powder which contains individually discretely encapsulated Maillard reaction reagents with the reaction reagents being at least one encapsulated amino acid and at least one encapsulated sugar;

(b) providing an uncooked fibrous proteinaceous muscle tissue foodstuff containing more than 50% water;

placing in intimate the contact with at least part of the surface of the foodstuff, a flavor augmenting, imparting or enhancing quantity of the particulate flowable flavoring powder of (a); and exposing the flavoring powder coated foodstuff surface to microwave powder-radiation for a period of time to cause the foodstuff to be edible whereby the resulting product is caused to be edible as a foodstuff and the cooked fibrous proteinaceous muscle tissue is edibly browned. Optionally, the particulate flowable flavoring powder may be in the form of a slurry with a solvent composition which is capable of raising the dielectric constant of the foodstuff to be cooked whereby the foodstuff to be cooked is completely cooked and edibly browned in the period of time under 600 seconds.

22 Claims, 8 Drawing Sheets

PROCESS FOR MICROWAVE BROWNING PROTEINACEOUS FIBROUS MEAT PRODUCTS

PRIOR APPLICATIONS

This application is a continuation-in-part of application for United States Letters Patent, Ser. No. 440,794 filed on Nov. 24, 1989 now U.S. Pat. No. 4,943,697 issued on July 24, 1990 Ser. No. 166,062, Mar. 9, 1988 Pat. No. 4,795,649 which is a division of application for U.S. Letters Patent, Ser. No. 356,503 filed on May 25, 1989, now U.S. Pat. No. 4,904,490 issued on Feb. 27, 1990 which is a continuation-in-part of application for U.S. Letters Patent, Ser. No. 295,450 filed on Jan. 10, 1989, now U.S. Pat. No. 4,882,184 issued on Nov. 21, 1989.

BACKGROUND OF THE INVENTION

The increased use of microwaves for cooking has given rise to a large market in microwavable foods. While the advantage of microwave cooking over convection oven cooking is the time savings, the disadvantage is that proteinaceous fibrous muscle tissue (e.g. turkey meat, chicken breast, brisket of beef, swordfish steak and the like) do not develop the surface browning or crust formation expected with convection oven cooking.

Our objective has been to create that browning which enhances the products appearance, making it look as if it were cooked in a convection oven.

In the microwave, food does not have sufficient time or temperature for the chemicals responsible for browning to react. Therefore, for a microwave browning system to work, it must accelerate the rate of the browning reactions or locally increase the surface temperature. Ultimately, the reactions responsible for browning have to be accomplished in the relatively short time frame dictated by the foods preparation conditions. The times needed for preparing microwave foods vary depending upon the power output of the microwave unit and the mass of the food to be cooked and the nature of the food to be cooked. A typical 750 watt microwave will cook proteinaceous fibrous muscle tissue foodstuffs in 6 to 15 minutes.

Several additional requirements for a successful microwave browning system are as follows:
1. In addition to the desired browning effect, it must generate either no aroma or one which is compatible with the target foodstuff;
2. The browning reaction must not take place before cooking the foodstuff;
3. After cooking, the browning must stop, and not darken the foodstuff substantially.

The reactions responsible for browning during convection oven cooking are the caramelization of sugars and the Maillard reaction between naturally occurring reducing sugars, amino acids, amines, peptides and proteins which results in the formation of colored melanoidins. Until recently (1984) there were numerous patent and literature references to such reactions for the production of flavors, where the generation of color was inconsequential or objectionable. In the past few years several patents have appeared wherein microwave browning created by Maillard reactions have been the topic. Thus, Bryson, et al. in U.S. Pat. No. 4,735,812 issued on Apr. 5, 1988 discloses a browning agent particularly for use in microwave cooking comprising collagen or gelatin hydrolyzed to its constituent amino acids plus one or more reducing sugars and alkalis. It is further indicated in Bryson, et al. that the collagen preferably is derived from Bovine hides, and that the alkalis are preferably a mixture of sodium carbonate and bicarbonate. It is further indicated that the browning agent may be incorporated into a film or used as a powder or liquid.

Parliment et al. U.S. Pat. No. 4,857,340 issued on Aug. 15, 1989 discloses a composition of an aroma producing material enrobed in a fusible encapsulating agent, preferably a lipid and in conductive heat transfer relationship with a microwave susceptible material when combined with a microwave comestible or package for providing an aroma when the comestible or package is prepared by subjecting the comestible or package and composition to microwave energy.

Kim et al., "Formation of Volatile Compounds from Maillard Reaction of D-Glucose with DL-Alanine in Propylene Glycol Solution", Han'guk Sikp'um Kwahakhoechi 1988, 20(2), 157–63 (Korea), (Abstracted at Chemical Abstracts Volume 112 at 34512q) discloses volatile compounds produced from the browning reaction of alanine and glucose using propylene glycol as a reaction medium.

Although the prior art does take advantage of the reaction between reducing sugars and amino acids, it has not made any correlation of reaction rates needed for browning reactions with reaction variables such as pH solvent, or sugar reactivity in connection with browning reactions concerning the surface of proteinaceous muscle tissue such as chicken breast.

BRIEF DESCRIPTION OF THE DRAWINGS

FIG. 1A is a cut-away side elevation view of an encapsulated Maillard reaction reactant, namely sugar encapsulated in fat.

FIG. 1B is a cut-away side elevation view of an encapsulated Maillard reaction reagent, namely sodium carbonate encapsulated in fat.

FIG. 1C is a cut-away side elevation view of an encapsulated Maillard reaction reactant, namely an amino acid encapsulated in fat.

FIG. 1D is a cut-away side elevation view of a poultry drumstick coated with fluid containing encapsulated Maillard reaction product reactants.

SUMMARY OF THE INVENTION

Figure 1:
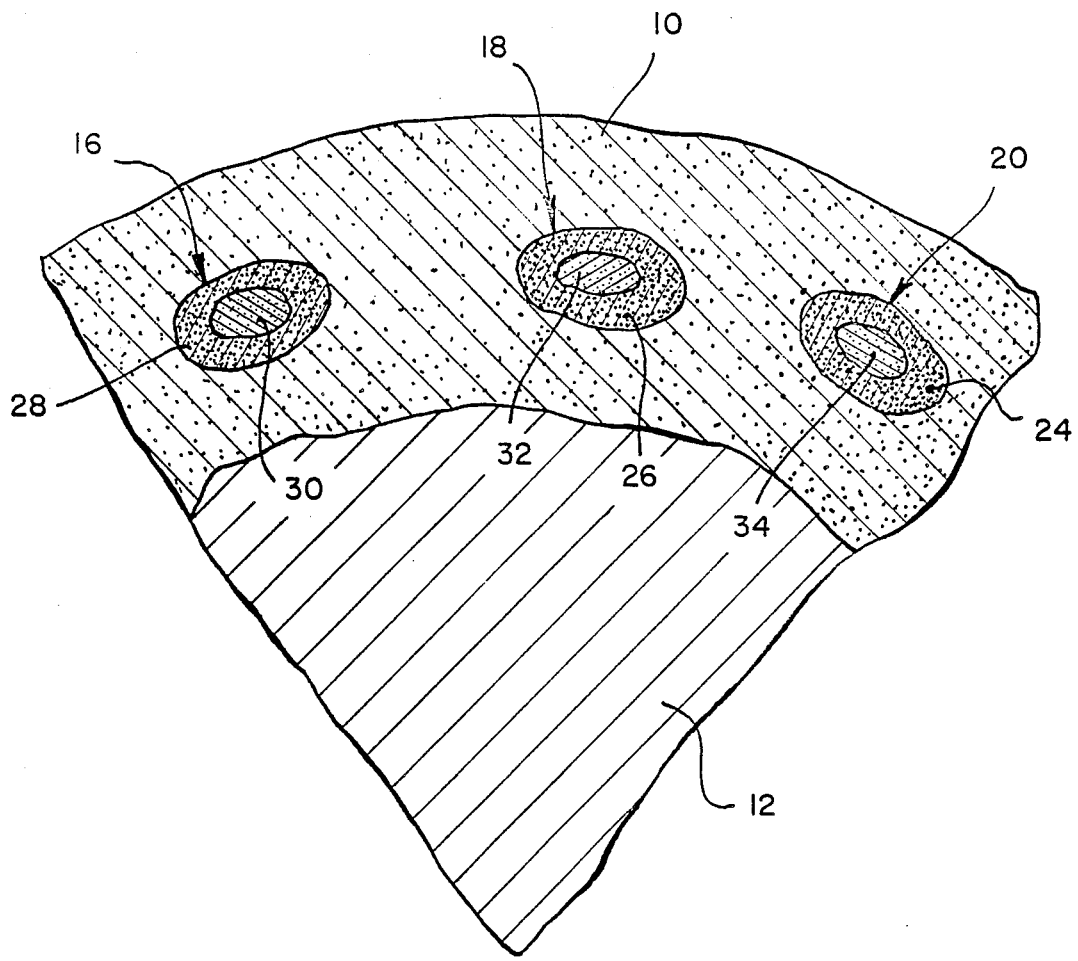
FIG. 1 is a cut-away side elevation view of a slurry-coated food article section coated with a fluid having intimately admixed therewith encapsulated Maillard reaction reactants (with optional pH adjustment agent) prior to carrying out the microwave browning step of the process of our invention.

Our invention is directed to a process for producing a cooked edibly browned storage stable fibrous proteinaceous muscle tissue foodstuff comprising the steps of:
  (a) providing a particulate flowable flavoring powder consisting essentially of @ individually discretly encapsulated Maillard reaction reagents, which Maillard reaction reagents are:
    (i) at least one encapsulated amino acid;
    (ii) at least one encapsulated sugar optionally admixed with at least one Maillard reaction promoter, and optionally
    (iii) at least one encapsulated pH adjustment agent and, optionally $\beta$ at least one Maillard reaction promoter;
  (b) providing an uncooked fibrous proteinaceous muscle tissue foodstuff containing more than 50% of water having an outer uncooked foodstuff surface;
  (c) placing in intimate contact with at least a major portion of said uncooked foodstuff surface a flavor augmenting, imparting or enhancing quantity of said particulate flowable flavoring powder thereby forming a flavoring powder-coated foodstuff surface; and
  (d) exposing the flavoring powder-coated foodstuff surface to microwave radiation for a predetermined controlled period of time, whereby the resulting product is caused to be edible as a foodstuff and the cooked fibrous proteinaceous muscle tissue foodstuff surface is edibly browned.

Our invention is also directed to the optional flavoring powder in admixture with a liquid whereby a slurry is formed with a solvent composition which is capable of raising the dielectric constant of the proteinaceous muscle tissue foodstuff to be cooked whereby the foodstuff to be cooked is completely cooked and edibly browned in a period of time under 600 seconds.

Our invention is also intended to encompass a process wherein the particulate flowable flavoring powder is prepared according to a process comprising the steps of:
  (i) heating a high melting point normally solid encapsulating material to melt the encapsulating material forming a molten encapsulating agent;
  (ii) separately mixing each of the Maillard reaction reagent containing components of the Maillard reaction reagent containing composition with discrete individual portions of the molten encapsulating agent; and
  (iii) spray chilling or drum chilling the Maillard reaction reagent containing composition mixture to provide discrete particles of solid Maillard reaction reagent-containing agent.

Our invention is also directed to another embodiment of the aforementioned process wherein the particulate flowable flavoring powder is prepared according to a process comprising:
  (i) heating a high melting point normally solid encapsulated material and at least one emulsifier to melt the encapsulating material and emulsifier;
  (ii) admixing the melted encapsulating material and emulsifier;
  (iii) separately mixing each component of the Maillard reaction reagent containing composition with a textured conditioning agent;
  (iv) separately mixing each component of the Maillard reaction reagent containing composition and textured conditioning agent with discrete individual portions of the molten mixture of encapsulating agent and emulsifier to obtain homogeneous mixtures in the form of emulsions;
  (v) mixing the resulting emulsions; and
  (vi) chilling the resulting Maillard reaction reagent containing compositi-containnig mixture to proide discrete particlesof solid encapsulted Maillard reaction reagent containing composition.

Our invention is also directed to the products produced according to such process.

With reference to that aspect of our invention involving the utilization of particulate flowable flavoring powder in the form of a slurry with a solvent composition which is capable of raising the dielectric constant of the foodstuff to be cooked, whereby the foodstuff to be cooked is completely cooked and edibly browned ina period of time under 600 seconds a mathematical model useful in relating each of the variables involved in the development of our invention is set forth thusly:

$$\frac{dQ}{d\theta} = \left\{ \frac{R}{K} + \frac{\mu}{\lambda_1 C_p \rho^2 R^2 (T_2 - T_1)} + \frac{1}{h_A} + \lambda_2 \left[ \frac{T_2 - T_1}{T_2^4 - T_1^4} \right] \right\} E^2 \nu \epsilon'$$

In an approximate version an equation for calculating the time of heating as a function of viscosity of the coating (prior to cooking) and further, as a function of the temperature differential between the center of the food article to be cooked and the outer surface of the coating during the microwave browning operation is set forth thusly:

$$\Delta\theta(\text{TIME}) = \frac{\text{TOTAL MICROWAVE ENERGY INPUT, } \Delta Q}{\left(\frac{R}{K} + \frac{\mu}{\lambda_1 C_p \rho^2 R^2 (T_2 - T_1)} + \frac{1}{h_A} + \lambda_2 \left[\frac{T_2 - T_1}{T_2^4 - T_1^4}\right]\right) E^2 \nu \epsilon'}$$

wherein the terms $\Delta Q$ is the total microwave energy input during the process of our invention;

$\frac{dQ}{d\theta}$ is the rate of heat input equivalent to the rate of energy use by the microwave oven;

$R$ is the effective radius of the food article being cooked;

$K$ is the heat transfer coefficient of the food article being cooked (the solid material);

$\mu$ is the viscosity of the coating immediately prior to cooking;

$\lambda$ is a proportionality constant which is a function of the coating thickness immediately prior to cooking and the geometry of the article being cooked as well as the geometry of the microwave oven;

$C_p$ is the heat capacity of the coating immediately prior to cooking;

$\rho$ is the density of the liquid coating immediately prior to cooking;

$T_1$ is the temperature at the center of the food article being cooked;

$T_2$ is the temperature at the outer surface of the food article being cooked;

$h_A$ is the convection heat transfer coefficient for the air layer surrounding the food article being cooked;

$\lambda_2$ is the proportionality constant for radiation term for concentric spheres (the coating surrounding the uncooked food);

$E$ is the electric field strength;

$\nu$ is the frequency;

$\epsilon'$ is the relative dielectric constant of coating material; and $\Delta\theta$ is the time of the microwave cooking.

The foregoing equations were derived from equations set forth in:

"Heat Transfer and Food Products", Hallstrom, et al, Elsevier Applied Science Publishing Company, 1988;

Principals of Chemical Engineering", Walker, et al, Third Edition, McGraw Hill Book Company, 1937; and "Chemical Engineer's Handbook", Fifth Edition, Perry and Chilton, McGraw Hill Book Company, pages 10—10, 10-11 and 10-12.

Our invention is also intended to cover apparatus for carrying out the aforementioned process which apparatus consists essentially of:

(i) separate encapsulating means for encapsulating Maillard reaction reagents to produce separate batches of capsules each containing an individual Maillard reaction reagent;

(ii) mixing means for mixing the separate batches of capsules to form a single batch of flowable capsules;

(iii) coating means for coating the said batch of capsules prepared using said mixing means onto an uncooked fibrous proteinaceous muscle tissue foodstuff, said coating means being downstream from said mixing means; and (iv) microwave cooking means downstream from said coating means to cook the coated uncooked fibrous proteinaceous muscle tissue foodstuff, whereby it becomes cooked, edibly browned and storage stable.

Another embodiment of the apparatus of our invention consists essentially of:

(i) separate encapsulating means for encapsulating Maillard reaction reagents to produce separate batches of capsules, each capsule including an individual Maillard reaction reagent;

(ii) first mixing means for mixing the separate batches of capsules to form a single batch of flowable capsules;

(iii) second mixing means downstream from said first mixing means for mixing said batch of flowable capsules with a solvent composition which is capable of raising the dielectric constant of a foodstuff to be cooked, whereby the foodstuff to be cooked is completely cooked and edibly browned in a period of time under 600 seconds, said second mixing means capable of handling a slurry consisting of said solvent and said flowable capsule;

(iv) coating means for coating the slurry prepared in using said second mixing means onto uncooked fibrous proteinaceous muscle tissue foodstuffs; and (v) microwave cooking means downstream from said coating means to cook the coated uncooked fibrous proteinaceous muscle tissue foodstuff or by said foodstuff becomes cooked, edibly browned and storage stable.

Preferred encapsulating materials have melting points of from about 130° F. up to about 195° F. and are more preferably fats or waxes having such melting points. Desirably, the encapsulating material is a hydrogenated or partially hydrogenated vegetable oil, stearate, a fatty glyceride ester or partial ester or a edible wax. More particularly the encapsulating agent is preferably a partially hydrogenated cottonseed oil, a partially hydrogenated soybean oil, a partially hydrogenated palm oil, a glycol monostearate, a glycerol monopalmitate, a propylene glycol monostearate, a polyglycerol stearate, a polyoxyethylene sorbitol, a fatty acid ester of polyoxyethylene sorbitan, a polyglycerol ester of fatty acid, bees wax, carnauba wax, paraffin wax or candellila wax.

When a texture conditioning agent is used, it is preferred that the quantity of textured conditioning agent is from about 0.1 up to about 1 times the amount of Maillard reaction reagent containing composition used.

When the encapsulation process is spray chilling, it is preferred that the homogeneous mixtures chilled by spraying the mixture into a stream of gas with the gas being preferred to have a temperature of from about 40° F. up to about 116° F. It is further preferred that the spraying be carried out using a centrifugal atomizer. It is further preferred that the homogeneous mixture be admixed with compressed air and sprayed through a nozzle. Furthermore, the mixture may be chilled by contact with a surface at a temperature less than the melting point of the encapsulating material to form flakes; and it is preferred that the flakes are reduced in size to pass through a number 10 screen prior to further use.

When using a solvent to form a slurry of capsules, the solvent is preferred to be glycerine, propylene glycol, mixtures of glycerine and propylene glycol from one part glycerine up to 99 parts propylene glycol down to 99 parts glycerine to 1 part propylene glycol, mixtures of glycerine and ethanol wherein the ethanol:glycerine ratio is from 50 parts ethanol:50 parts glycerine down to 1 part ethanol:99 parts glycerine and mixtures of propylene glycol and ethanol wherein the ratio of propylene glycol:ethanol is from 50 parts propylene glycol:50 parts ethanol down to 99 parts propylene glycol:1 part ethanol.

It is preferred that the sugar reactant in the Maillard reaction product reagent composition is one of the following sugars:
Rhamnose;
Xylose;
Arabanose;
Ribose;
Fructose; and
Glucose Furthermore, it is preferred that the amino acid reactant in the Maillard reaction reagent composition is one of the following amino acids:
Lysine;
Arginine;
Cysteine
Methionine;
Yeast Extract; and
Hydrolyzed Vegetable Protein.

It is also preferred that the Maillard reaction reagent particles be reduced in size to pass through a 100 mesh screen prior to their being encapsulated.

A Maillard reaction promoter such as polyvinyl pyrrolidone, may, optionally be encapsulated along with the sugar prior to being placed on the surface of the proteinaceous muscle tissue prior to microwave cooking.

Furthermore, the Maillard reaction promoter such as polyvinyl pyrrolidone may be separately added to the encapsulated Maillard reaction reagent composition prior to coating on the proteinaceous meat muscle tissue prior to microwave cooking.

In one aspect of our invention each of the browning precursors (Maillard reaction product reagents) are individually incorporated into a controlled release system prior to coating onto the proteinaceous muscle tissue foodstuff to be cooked via microwave cooking. Thus, for example, the amino acid precursor or mixture of amino acid precursors are admixed with a fat in a weight ratio from 1 part amino acid precursor to 2 parts fat down to 1 part fat composition to 2 parts precursor composition. The resulting mixture is drum chilled as more specifically set forth in the examples infra. The drum chilled product is then admixed with a similarly formed drum chilled or spray chilled encapsulated sugar and similarly formed drum chilled or spray chilled encapsulated sodium carbonate. The resulting mixture is then either admixed with a solvent as set forth supra or per se coated onto a meat product, for example:
Turkey meat;
Chicken breast;
Brisket of Beef;
Swordfish Steak; and the like.

The resulting product is then placed in a microwave oven and the microwave oven is maintained in heating mode for a period of at least 6 minutes. The resulting product is edibly browned and has substantially entire flavor retention.

DETAILED DESCRIPTION OF THE DRAWINGS

Referring to the drawings, FIG. 1 is a cut-away side elevation view of a slurry-coated food article section 12 coated with a fluid such as glycerine 10 having intimately admixed therewith encapsulated Maillard reaction reactants with optional pH adjustment agent prior to carrying out the microwave browning step of the process of our invention.

Thus, the solvent composition 10 is capable of raising the dielectric constant of the foodstuff 12 to be cooked whereby the foodstuff 12 to be cooked is completely cooked and edibly browned in a period of time of from 6 to 15 minutes (under 900 seconds and preferably under 600 seconds). The solid components of the slurry have been previously encapsulated according to the processes as set forth in FIGS. 3, 4 and 5. More specifically, the particle indicated by reference numeral 16 is a fat encapsulated sugar particle with the fat being indicated by reference numeral 28 and the sugar being indicated by reference numeral 30. This particular particle is also shown in detailed cross-section form in FIG. 1A. Furthermore, the particle indicated by reference numeral 18 is a fat encapsulated sodium carbonate particle with the fat indicated by reference numeral 26 and the sodium carbonate indicated by reference numeral 32. The sodium carbonate is a pH adjustment agent for the Maillard reaction which is carried out during the microwave heating. Similarly, the particle indicated by reference numeral 20 is a fat encapsulated amino acid particle with the amino acid itself being indicated by reference numeral 34 and the fat encapsulating the amino acid being indicated by reference numeral 24.

FIG. 1D is a poultry drumstick coated with fluid (indicated by reference numeral 10) containing encapsulated Maillard reaction reagent reactants. The particles set forth in FIGS. 1A, 1B and 1C are once again repeated using the same reference numerals in FIGS. 1D. Thus, reference numeral 10 indicates the solvent such as glycerine or a mixture of propylene gylcol glycerine. Reference numeral 16 indicates the encapsulated sugar. Reference numeral 18 indicates the encapsulated sodium carbonate. Reference numeral 20 indicates the encapsulated amino acid. Reference numeral 12 indicates the proteinaceous meat on which the slurry is coated, in this case being the meat of a turkey drumstick or a chicken drumstick. The same drumstick is set forth in schematic form in FIG. 2.

Figure 2:
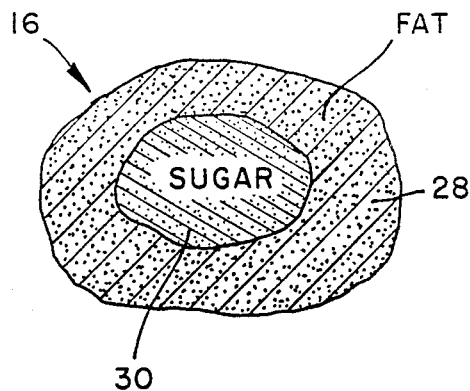
FIG. 2 is a cut-away side elevation view (in schematic form) of a microwave oven containing a coated food article (coated with fluid containing encapsulated Maillard reaction product reactants) prior to and during the carrying out of the process of our invention.
Figure 2:
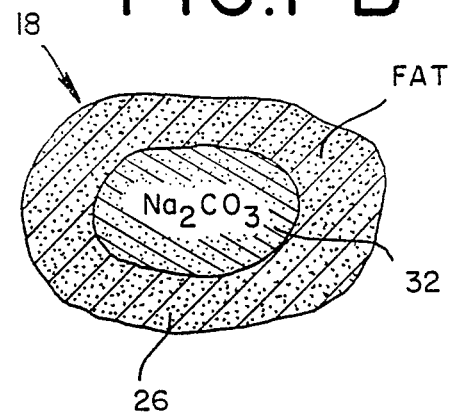
Figure 2:
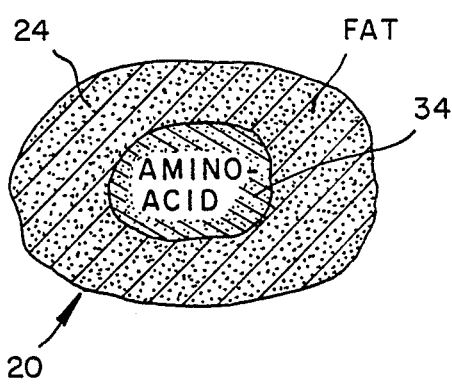
Figure 2:
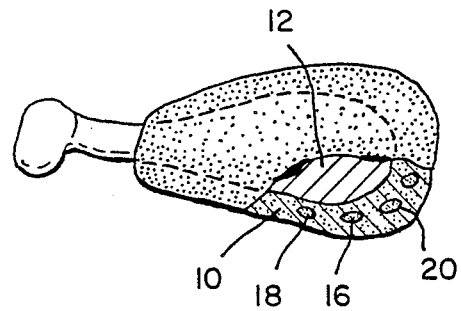
Figure 2:
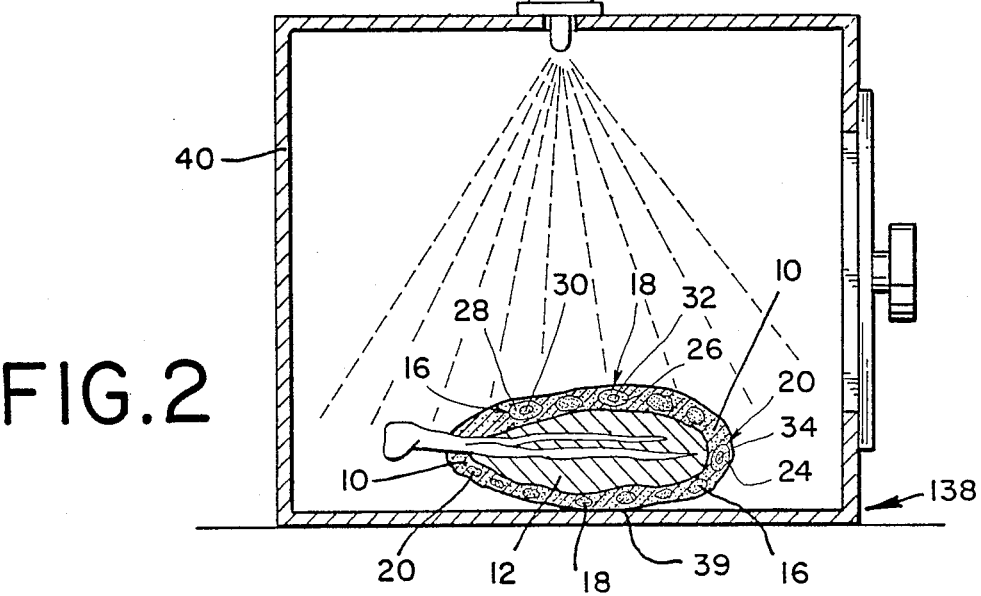

Thus, FIG. 2 is a cut-away side elevation view (in schematic form) of a microwave oven indicated by reference numeral 138 containing a coated food article of the type set forth in cross-section form in FIG. 1-D. The food article having the slurry coating on the uncooked proteinaceous foodstuff 12 is contained in microwave oven 138, more specifically in box 40 wherein microwave source 42 emits energy substantially perpendicular to the upper surface of the food article. The microwave energy passes through the coating surface and causes the reaction in the coating which contains solvent 10 and encapsulated Maillard reaction reagent reactants 34 and 30 to take place whereby Maillard reaction products are produced. The solvent 10 heats up and activates the molecules of the reactants. Simultaneously, the solid proteinaceous fibrous meat material 12 is heated and the coating containing the solvent 10 is adsorbed through the surface of the proteinaceous foodstuff into the outer interstices of the proteinaceous meat 12. Prior to 900 seconds (preferably 600 seconds) the entire proteinaceous fibrous meat product is cooked and the surface coating now containing the Maillard reaction product is substantially adsorbed into the outer interstices of the proteinaceous food article.

The proteinaceous food article rests at point 39 in box 40.

Figure 2B:
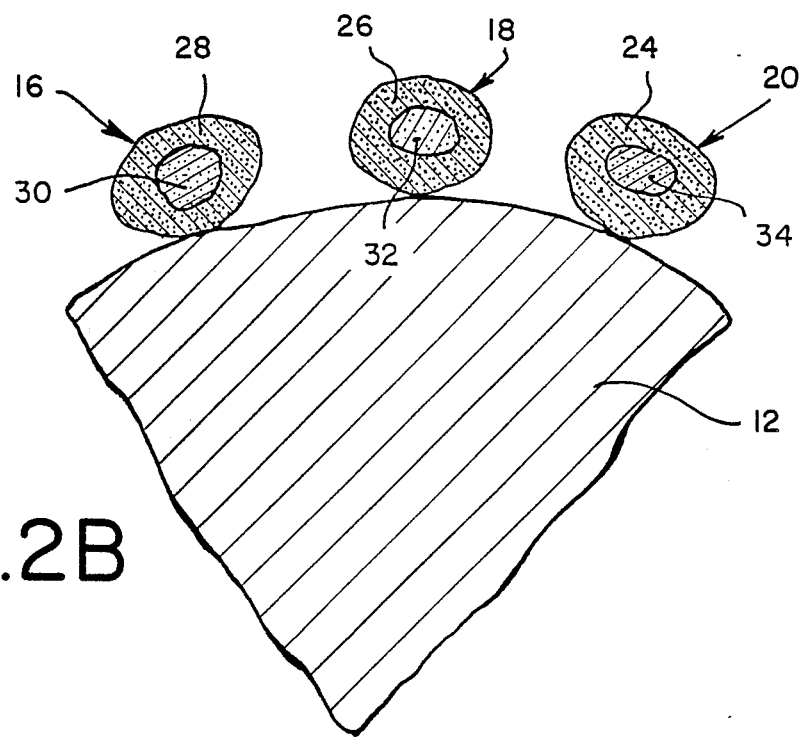
FIG. 2B is a cut-away side elevation view of a coated food article section coated with encapsulated Maillard reaction product reactants (with optional pH adjustment agent).

In view of the fact that the proteinaceous food article prior to cooking contains more than 50% water, the use of the solvents such as glycerine or mixtures of glycerine propylene glycol or mixtures of propylene glycol and ethanol is not necessary (although such use of a solvent is preferred). Thus, referring to FIG. 2B, FIG. 2B is a cut-away side elevation view of a coated food article coated with encapsulated Maillard reaction product reagents with the optional pH adjustment agent. The proteinaceous food article is indicated by reference numeral 12. The encapsulated sugar is indicated by reference numeral 16 with the actual sugar being indicated by reference numeral 30 and the fat encapsulating agent being indicated by reference numeral 28. The encapsulated pH adjustment agent, sodium carbonate is indicated by reference numeral 18 with the actual sodium carbonate particle being indicated by reference numeral 32 and the fat encapsulating agent being indicated by reference numeral 26. The amino acid reactant is indicated by reference numeral 20 with the actual amino acid particle being indicated by reference numeral 34 and the fat encapsulating agent being indicated by reference numeral 24. Again, the fat encapsulation is carried out by using the processes of FIGS. 3, 4 and 5.

Figure 2A:
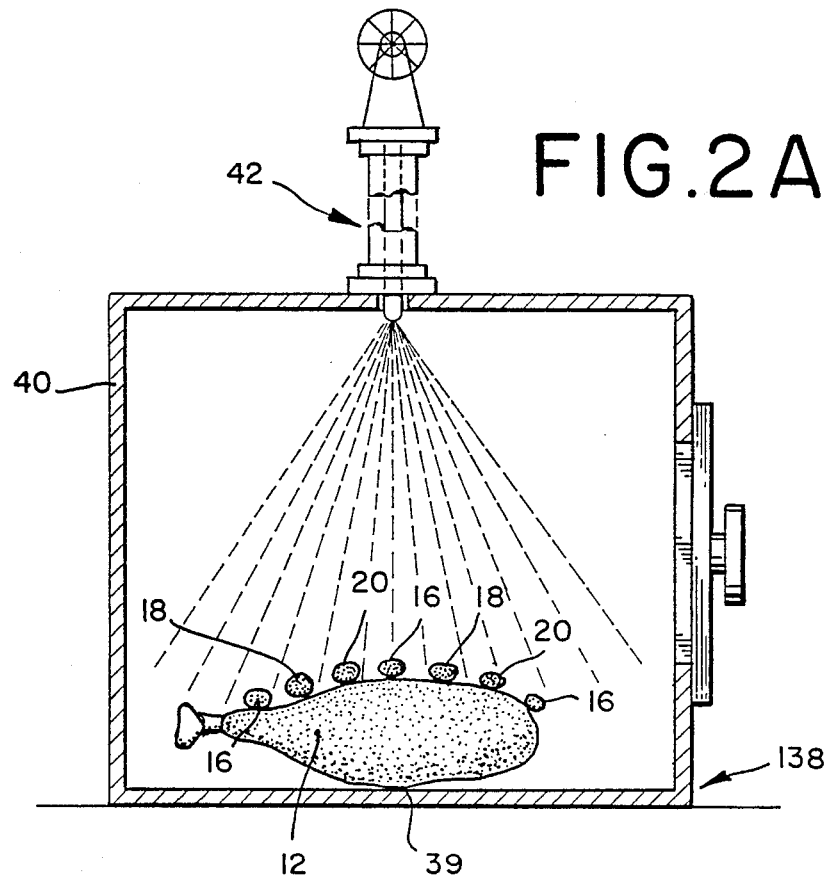
FIG. 2A is a cut-away side elevation view (in schematic form) of a microwave oven containing a coated food article (coated with encapsulated Maillard reaction product reactants) prior to and during the carrying out of another embodiment of the process of our invention.

FIG. 2A is a cut-away side elevation view (in schematic form) of a microwave oven 138 containing a coated food article prior to and during the carrying out of the process of our invention, wherein the coating is of the type set forth in detail in FIG. 2B.

A turkey or chicken drumstick having proteinaceous fibrous muscle tissue 12 is coated with capsules 16, 18 and 20 as shown in FIG. 2B. The uncooked proteinaceous muscle tissue drumstick is contained in microwave oven 138, more specifically in box 40 wherein microwave source 42 emits energy substantially perpendicular to the upper surface of the food article. The microwave energy passes through the surface of the muscle tissue and causes the reaction to take place (aided by the evolution of water vapor from the muscle meat tissue 12) whereby Maillard reaction products are produced. The water in the meat muscle tissue 12 heats up and activates the molecules of the reactants in capsules 16, 18 and 20. Simultaneously, the solid material 12 (the meat muscle tissue) is heated and the Maillard reaction products are adsorbed through the surface thereof into the outer interstices of the meat muscle tissue product 12. Prior to 900 seconds (preferably 600 seconds) the entire drumstick is cooked and the surface coating now containing the Maillard reaction product is substantially adsorbed into the outer interstices of the drumstick. The food article rests at point 39 in box 40.

Figure 3:
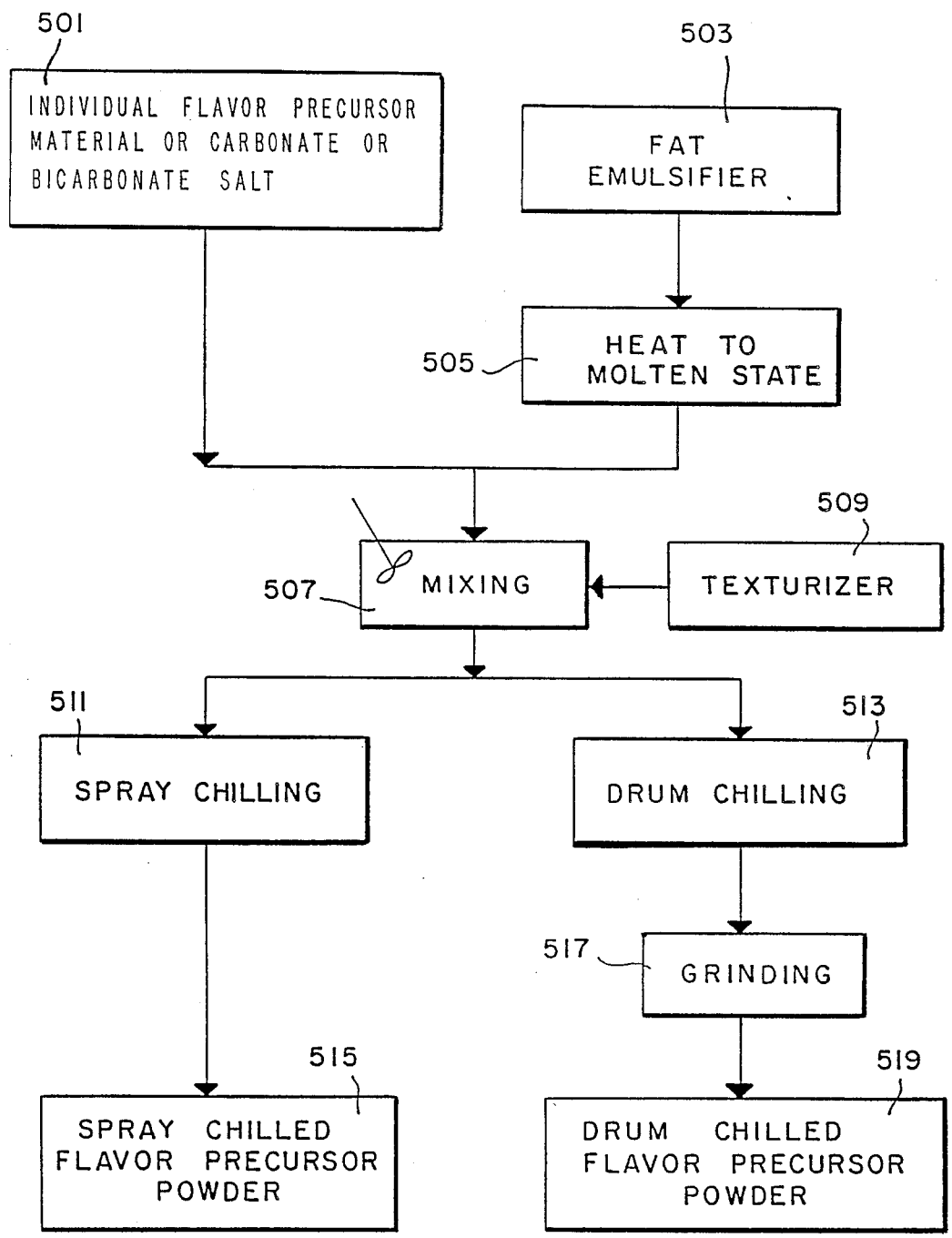
FIG. 3 is a block flow diagram showing the steps, in schematic form for carrying out the process for forming drum chilled Maillard reaction product reactant in encapsulated form and spray chilled Maillard reaction product reactant in encapsulated form useful in the practice of the process of our invention.

FIG. 3 sets forth a schematic block flow diagram of the process for producing spray chilled Maillard reaction reagent containing powder or drum chilled Maillard reaction reagent containing powder useful in forming material for incorporation into the interstices of the uncooked proteinaceous muscle tissue food product during cooking.

Individual Maillard reaction reagent taken optionally with pH adjustment material (e.g. sodium carbonate or sodium bicarbonate, for example) in location 501 is admixed with molten fat from location 505 (optionally admixed with fat emulsifier from location 503) with the mixing taking place in mixing means 507 together, optionally, with texturizer from location 509.

The resultant mixture created at mixing means 507 may then either be spray chilled at location 511 or drum chilled at location 513. The spray chilled precursor product at location 515 is then admixed with additional spray chilled precursor product (for example, spray chilled encapsulated amino acid is admixed with spray chilled encapsulated sugar) which may be further admixed with spray chilled sodium carbonate.

The drum chilled product from location 513 is ground at location 517 yielding individual drum chilled precursor powder. The drum chilled precursor, for example, drum chilled encapsulated amino acid may then be admixed with drum chilled or spray chilled encapsulated sugar which may be further admixed with drum chilled or spray chilled pH adjustment agent such as encapsulated sodium carbonate or encapsulated sodium bicarbonate.

Samples of fatty materials useful in this process are set forth supra and their respective melting points are as follows:

TABLE I

| Fatty Material | Melting Point Range |
|---|---|
| Partially hydrogenated cotton seed oil | 141–147° F. |
| Partially hydrogenated soybean oil | 152–158° F. |
| Partially hydrogenated palm oil | 136–144° F. |
| Mono and diglycerides | 136–156° F. |
| Glycerol monostearate | 158° F. |
| Glycerol monopalmitate | 132° F. |
| Propylene glycol monostearate | 136° F. |
| Polyglycerol stearate | 127–135° F. |
| Polyoxyethylene sorbitol beeswax derivatives | 145–154° F. |
| Polyoxyethylene sorbitan esters of fatty acids | 140–144° F. |
| Sorbitan monostearate | 121–127° F. |
| Polyglycerol esters of fatty acids | 135–138° F. |
| Beeswax | 143–150° F. |
| Carnauba wax | 180–186° F. |

Figure 4:
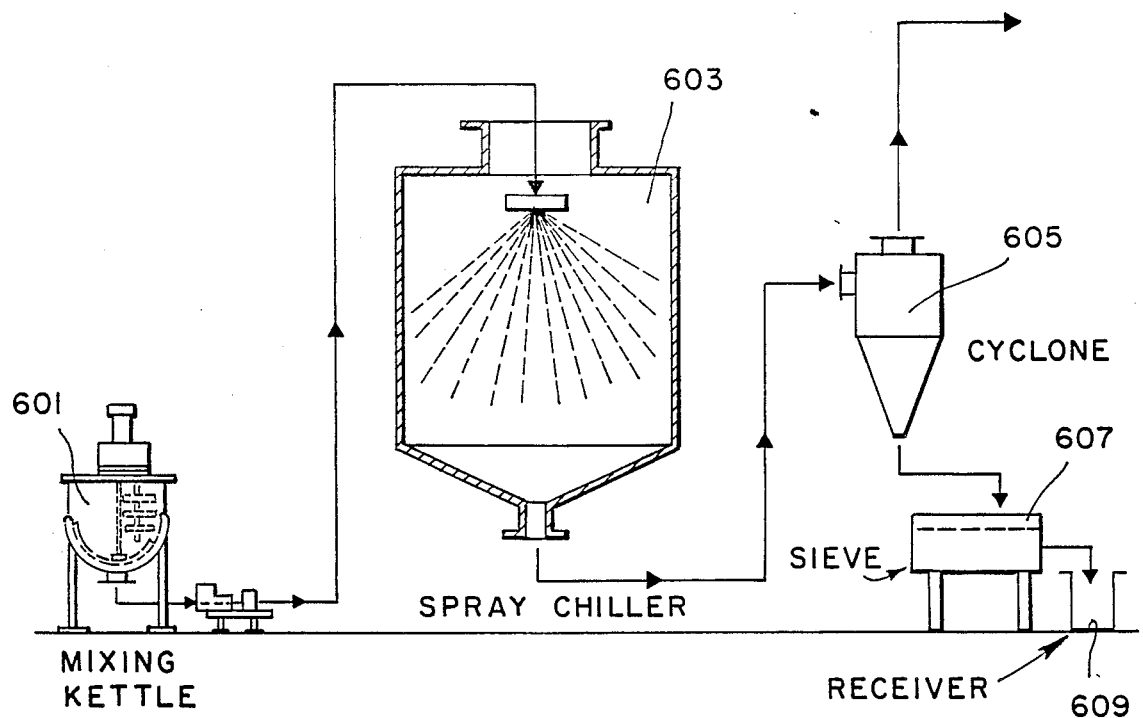
FIG. 4 is a schematic diagram setting forth apparatus and process steps useful in forming spray chilled Maillard reaction product reactant flavor precursor (in encapsulated form) useful in the practice of the process of our invention.

Texturizers include precipitated silicon dioxide, for example, SIPERNAT® 50S (bulked density 6.2 pounds per cubic foot; particle size 8 microns; surface area 450 square meters per gram manufactured by the Degussa Corporation of Teterboro, New Jersey. Other silicon dioxide texturizers are as follows:

SIPERNAT® 22S manufactured by Degussa Corporation;
ZEOTHIX® 265 manufactured by J. M. Huber Corporation of Havre de Grace, Maryland;
CAB-O-SIL® EH-5 manufactured by the Cabot Corporation, of Tuscola, Illinois;

FIG. 4 is a diagram of the process and apparatus (in schematic form) for producing spray chilled Maillard reaction precursor powder useful in the process of our invention (which powder may additionally contain Maillard reaction promoter and pH adjustment agent). Maillard reaction precursor materials, fat emulsifier in molten state and texturizer are admixed in mixing kettle 601. The resulting mixture is spray chilled in spray chiller 603 and the resulting spray chilled particles containing Maillard reaction precursor and optionally pH adjustment agent and optionally Maillard reaction promoter are classified. The classification is carried out in cyclone separator 605 with the larger size particles which are useful in the practice of our invention going through seive 607 into receiver 609.

More specifically, the molten mixture maintained in the fluid state is pumped to the "spray chiller" which is actually a spray dryer and atomized into fine droplets using an atomizer. A nozzle may be specifically engineered to exclude chilled air or chilled air may be utilized to solidify the resulting fat particles. Atmospheric unheated air may be used to blow through the spray dryer. The final product collected is in fine powder form with particles about 50–120 microns in size.

Figure 5:
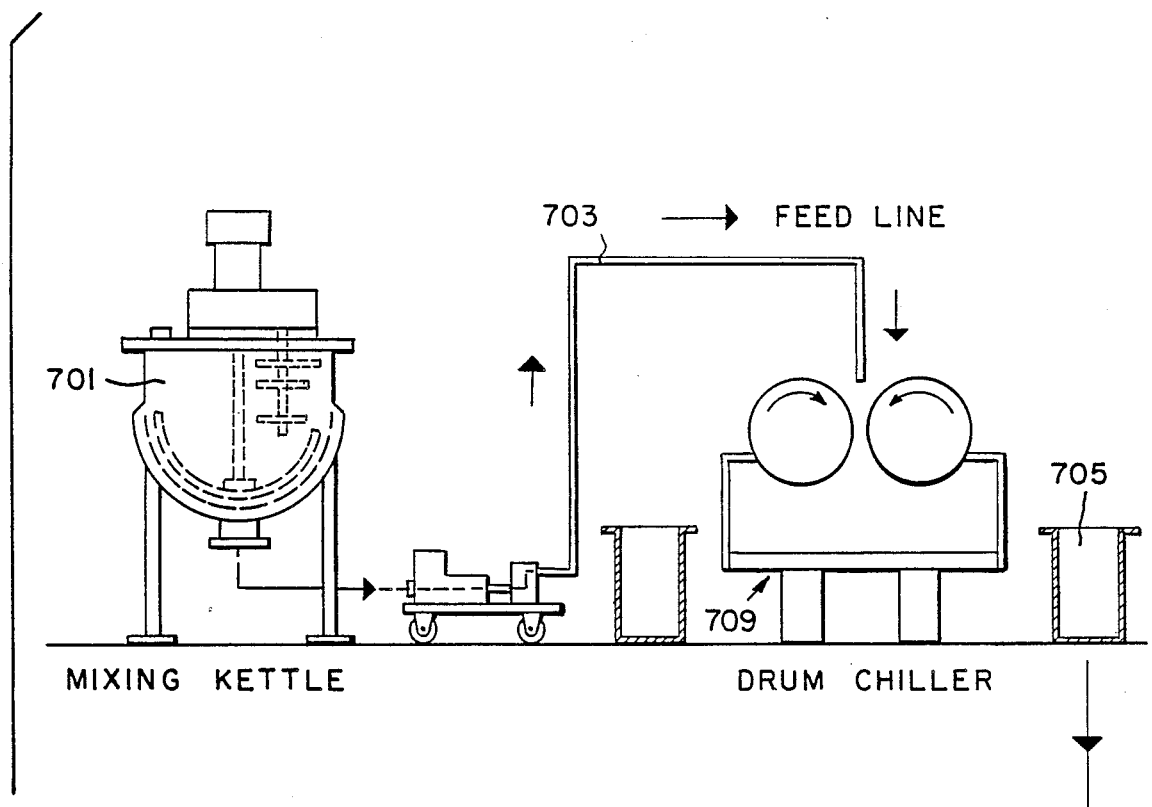
FIG. 5 is a flow diagram setting forth in schematic form the apparatus and process steps required in producing drum chilled Maillard reaction product reagents in encapsulated form useful in the practice of the process of our invention.
Figure 5:
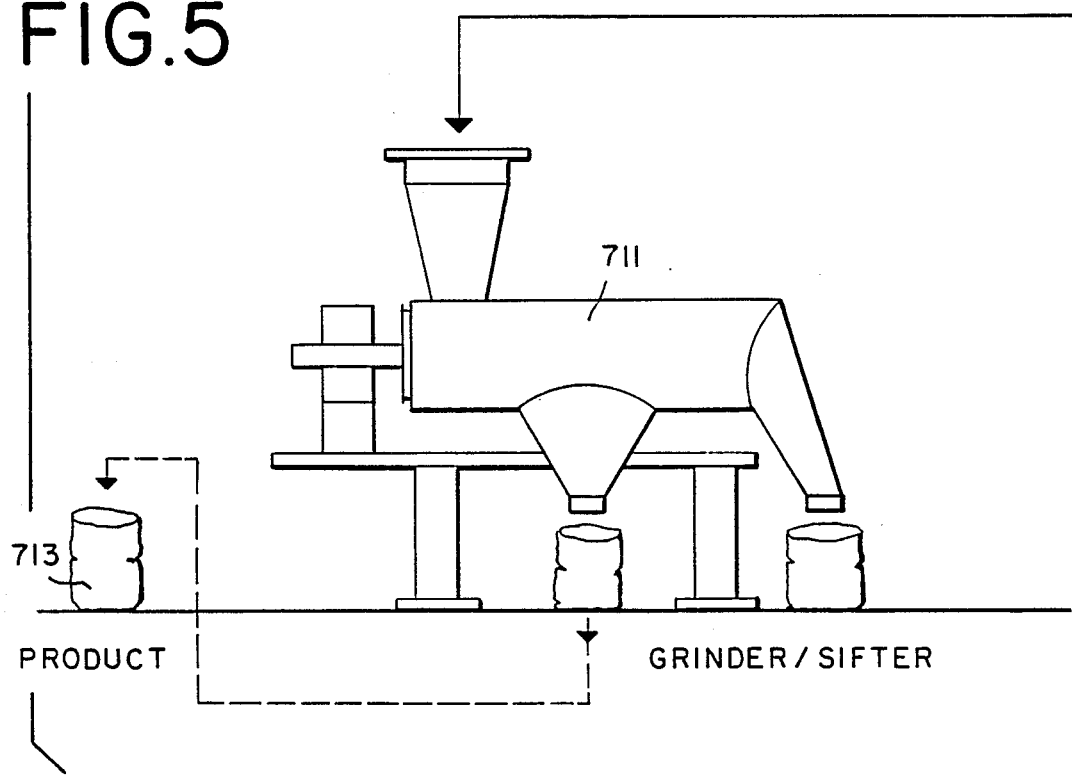

FIG. 5 is a schematic diagram setting forth a process and apparatus useful in preparing drum chilled Maillard reaction reagent powder (additionally containing Maillard reaction promoter and Maillard reaction pH adjustment agent) useful in carrying out the process of our invention, wherein the resulting powder separately contains amino acid, sugar and pH adjustment agent. Each of these materials is produced in a separate step.

The Maillard reaction reagent precursor material, for example, the amino acid arginine is admixed with molten fat and emulsifier (optional) and texturizer (optional) in mixing kettle 701. The molten material is then pumped through feed line 703 into drum chiller 709. The resulting drum chilled product collected at location 705 is passed into grinder/sifter 711 and then collected at location 713.

An example of a grinder/sifter useable in the instant invention is the KEMUTEC BETAGRIND®. Another example of workable apparatus is the KEK-Gardner Centrifugal Sifter.

Figure 6:
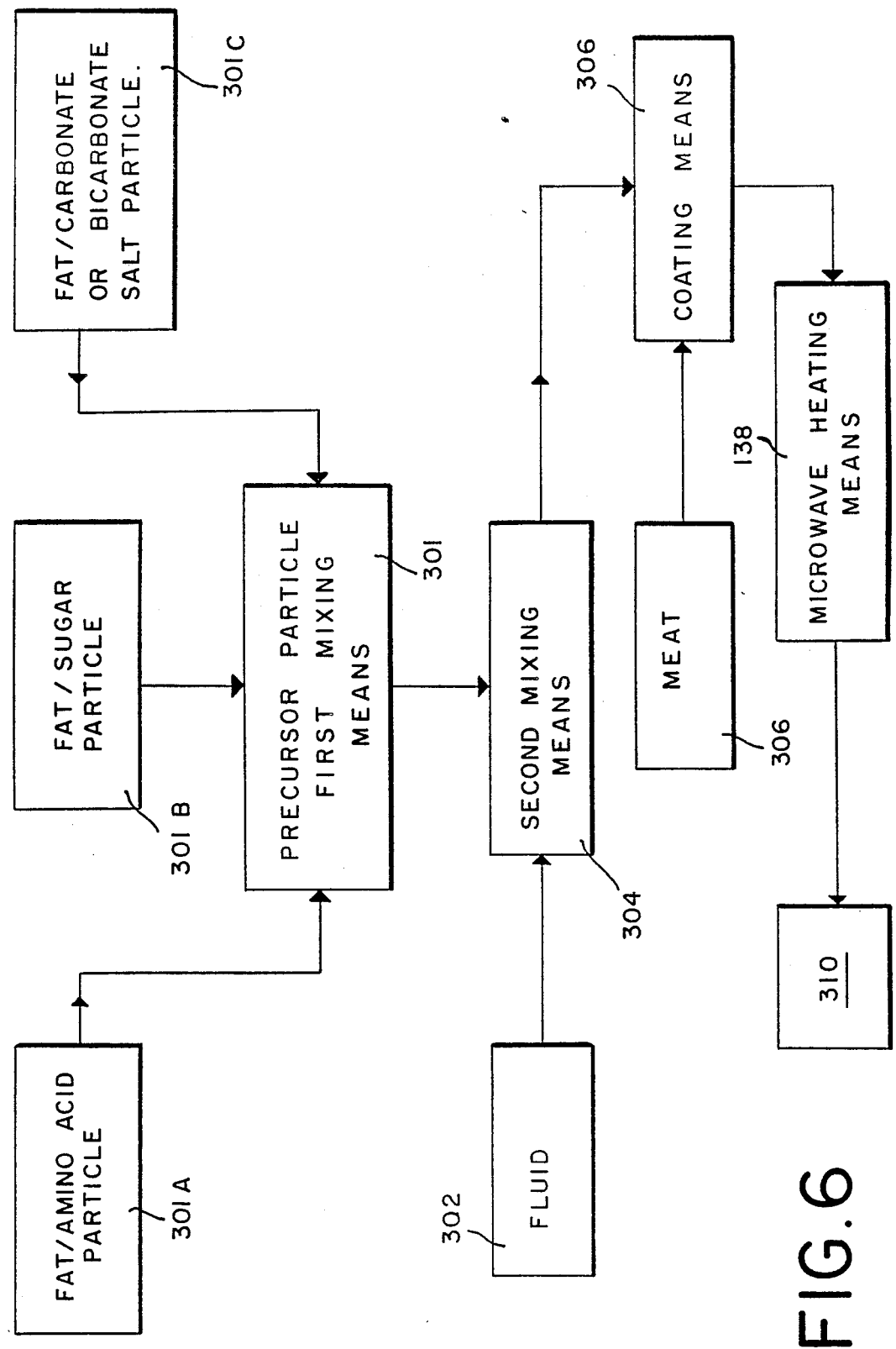
FIG. 6 is a block flow diagram showing the steps, in schematic form, for carrying out the process of our invention and indicating the multiple means (apparatus elements) useful in carrying out the process of our invention whereby an uncooked proteinaceous muscle tissue food article is coated with encapsulated Maillard reaction product reagents, individually, in slurry form, prior to microwave heating.

FIG. 6 sets forth a schematic block flow diagram of the process of our invention whereby fluid, e.g., glycerine located at 302 and encapsulated Maillard reaction reagents from location 301 are mixed at second mixing means 304. The resulting slurry is utilized at coating means 306. Proteinaceous muscle tissue meat product, e.g., chicken breast meat from location 306, is coated at coating means 306 and then placed into microwave heating means 138 wherein the proteinaceous food product is cooked for a period of time less than 900 seconds (preferably less than 600 seconds) and transported for marketing to location 310. The precursor particle materials individually produced according to the processes shown in FIGS. 3, 4 and 5 supra are shown as individual particles coming from locations 301A, 301B and 301C. Thus, for example, encapsulated amino acid particles produced according to the process of FIG. 5 are located at location 301A. Encapsulated sugar particles produced according to the process of FIG. 4 are located at 301B. Encapsulated pH adjustment agents such as fat encapsulated sodium carbonate or fat encapsulated sodium bicarbonate at location 301C are produced according to the process of FIG. 4.

Figure 7:
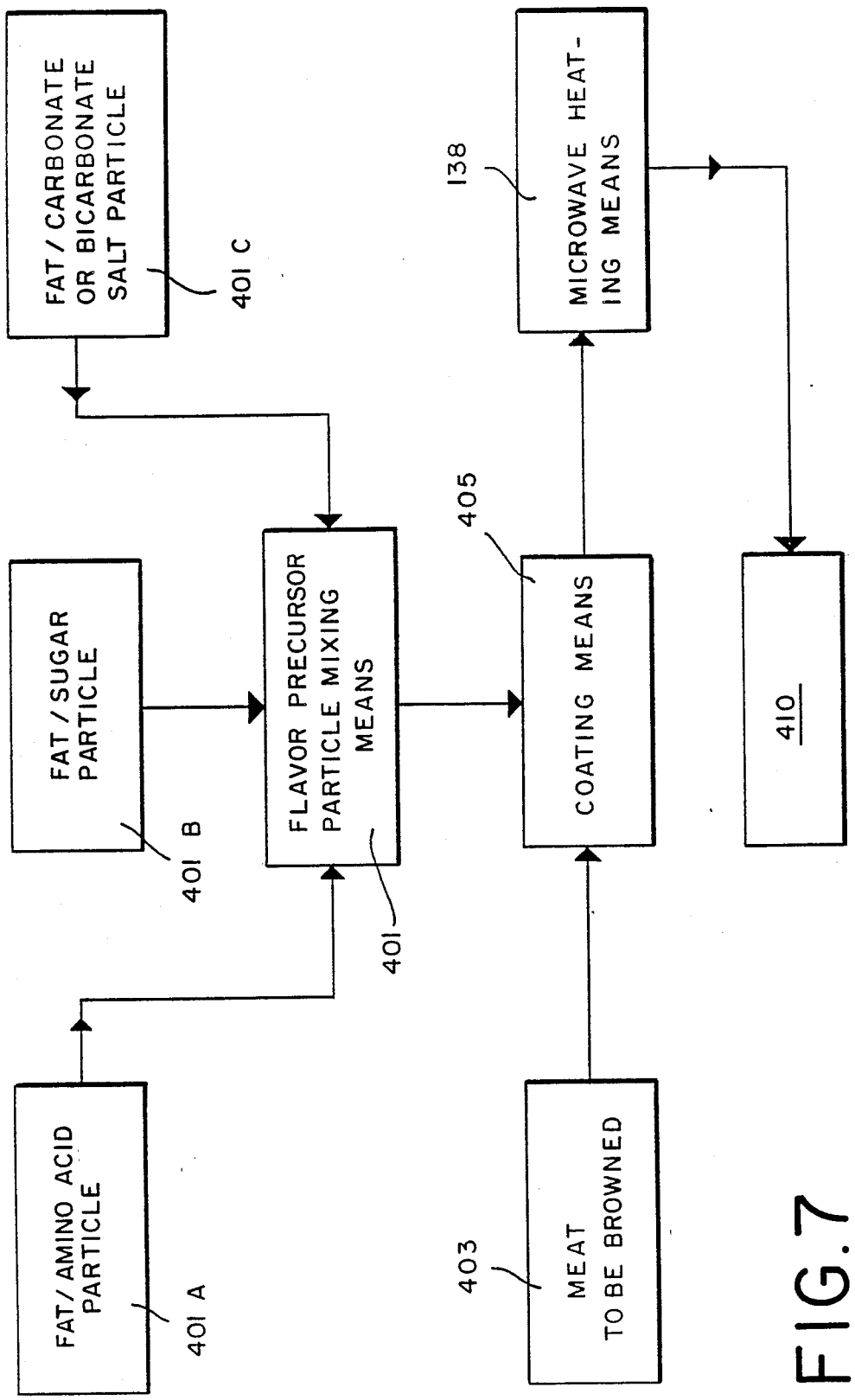
FIG. 7 is a block flow diagram showing the steps, in schematic form, for carrying out another aspect of the process of our invention and indicating the multiple means (apparatus elements) useful in carrying out that aspect of the process of our invention wherein browning precursor powder (encapsulated Maillard reaction product reagents) is applied to a portion of the surface of the uncooked food article prior to microwave heating.

FIG. 7 sets forth the schematic block flow diagram of another aspect of the process of our invention whereby Maillard reaction reagent precursor powder, for example, drum chilled fat encapsulated amino acid from location 401A (produced according to the process of FIG. 5), spray chilled fat encapsulated sugar from location 401B (produced according to the process of FIG. 4) and drum chilled fat encapsulated pH adjustment agent sodium carbonate or sodium bicarbonate from location 401C (produced according to the process of FIG. 5) are admixed in flavor precursor particle mixing means 401. The resulting mixture is then coated onto meat muscle tissue (turkey breast, for example) from location 403 at coating means 405. The coated meat muscle tissue from location 405 is placed into microwave heating means 138 where microwave cooking takes place and the foodstuff to be cooked is completely cooked and edibly browned in a period of time under 900 seconds (preferably under 600 seconds). The resulting cooked articles are then transported for marketing to location 410.

It should be noted that an additional advantage achieved in practicing our invention wherein the flavor precursor liquid composition is coated unto uncooked proteinaceous muscle tissue foodstuffs is that water evaporation is retarded when the resulting coated product is cooked in a microwave oven. This advantage, too, is unexpected, and unobvious and advantageous.

The principles given above are illustrated in the following examples:

EXAMPLE I

Formation of Spray Chilled Fat Encapsulated Xylose

Twelve hundred grams of xylose is admixed with 540 grams of 30% MYVEROL® 1806 and 1260 grams of DURKEE 07® fat.

The spray chilling operation is carried out in accordance with the apparatus described for FIG. 4. The mixing is carried out in mixing kettle 601. The run time is 15 minutes. The yield is 1080 grams. The feed pump flow rate is 6.5 grams per minute.

Similarly fat encapsulated lysine and fat encapsulated sodium carbonate are produced.

The yield of the fat encapsulated lysine is 1730 grams.

The yield of the fat encapsulated sodium carbonate is 670 grams.

The feed temperature is between 80° and 90° C.

EXAMPLE II

Production of Chicken Browning Mix

The objective of this experiment is to make a good browning mixture which works on a chicken breast fillet cooked in a microwave oven.

Chicken breast filets were cut into 6×12×0.7 cm pieces.

0.4 Grams of a browning mix powder containing 2 grams encapsulated xylose, 2 grams encapsulated lysine and 2 grams encapsulated sodium carbonate was added onto each piece of chicken breast.

The chicken breasts were placed into a 700 watt microwave oven and the chicken pieces were cooked at medium power for 2 minutes.

Aesthetically pleasing, edibly browned chicken filets were produced.

Substantially, identical results were created using the following chicken browning coating mixtures:

| Ingredients | Parts by Weight |
|---|---|
| EXAMPLE II-2: | |
| Xylose | 2 grams |
| Lysine | 2 grams |
| Sodium Carbonate | 2 grams |
| METHOCEL® A15-LV METHOCELLUSE | 2 grams |
| EXAMPLE II-3: | |
| Ribose | 2 grams |
| Lysine | 2 grams |
| Sodium Carbonate | 2 grams |
| EXAMPLE II-4: | |
| Glucose | 2 grams |
| Lysine | 2 grams |
| Sodium Carbonate | 2 grams |
| EXAMPLE II-5: | |
| Lactose | 2 grams |
| Lysine | 2 grams |
| Sodium Carbonate | 2 grams |
| EXAMPLE II-6: | |
| Fructose | 2 grams |
| Lysine | 2 grams |
| Sodium Carbonate | 2 grams |
| EXAMPLE II-7: | |
| Glucose | 2 grams |
| Cysteine | 2 grams |
| Sodium Carbonate | 2 grams |
| EXAMPLE II-8: | |
| Xylose | 2 grams |
| Cysteine | 2 grams |
| Sodium Carbonate | 2 grams |
| EXAMPLE II-9: | |
| Fructose | 2 grams |
| Cysteine | 2 grams |
| Sodium Carbonate | 2 grams |
| EXAMPLE II-10: | |
| Glucose | 2 grams |
| Methionine | 2 grams |
| Sodium Carbonate | 2 grams |
| EXAMPLE II-11: | |
| Xylose | 2 grams |
| Methionine | 2 grams |
| Sodium Carbonate | 2 grams |
| EXAMPLE II-12: | |
| Fructose | 2 grams |
| Methionine | 2 grams |
| Sodium Carbonate | 2 grams |

EXAMPLE III

Chicken Browning Mix

An example similar to Example II is carried out except the chicken breast filet size was larger (10×6×0.7 cm). The cooking time was 2 minutes at medium power using a CAROUSEL II SHARP® 700 watt microwave oven. Each browning was prepared by grinding in a mortar and sprinkling on the surface of the chicken piece.

The coating mixes produced according to the procedure of Example I were as follows and the degree of browning was as follows:

| SAMPLE COMPOSITION | AMOUNT ADDED | DEGREE OF BROWNING (SCALED FROM 1 TO 5) |
|---|---|---|
| EXAMPLE III-1 | | |
| 2 g lysine | 0.4 g | +5 |
| 2 g lysine | | |
| 2 g xylose | | |
| 2 g Na$_2$CO$_3$ | | |
| EXAMPLE III-2 | | |
| 2 g lysine | 0.4 g | +2 |
| 2 g xylose | | |
| 1 g lysine | | |
| EXAMPLE III-3 | | |
| 2 g lysine | 0.4 g | +1 |
| 2 g xylose | | |
| 0.5 g citric acid | | |
| EXAMPLE III-4 | | |
| 2 g lysine | 0.4 g | +1 |
| 2 g Ascorbic acid | | |
| 2 g Na$_2$CO$_3$ | | |
| EXAMPLE III-5 | | |
| 2 g lysine | 0.4 g | +2 |
| 1 g Ascorbic acid | | |
| 2 g Na$_2$CO$_3$ | | |
| EXAMPLE III-6 | | |
| 2 g lysine | 0.4 g | +1 |
| 2 g Ascorbic acid | | |
| 1 g Na$_2$CO$_3$ | | |
| EXAMPLE III-7 | | |
| 2 g lysine | 0.4 g | +1 |
| 2 g Ascorbic acid | | |
| 0.5 g citric acid | | |
| EXAMPLE III.-8 | | |
| 2 g lysine | 0.4 g | +1 |
| 2 g Ascorbic acid | | |
| 2 g Na$_2$CO$_3$ | | |
| EXAMPLE III-9 | | |
| 2 g YMB-29(Yeast Extract) | 0.4 g | +5 |
| 2 g xylose | | |

| SAMPLE COMPOSITION | AMOUNT ADDED | DEGREE OF BROWNING (SCALED FROM 1 TO 5) |
|---|---|---|
| 2 g Na₂CO₃ | | |
| EXAMPLE III-10 | | |
| 2 g VEGAMINE ® 128 | 0.4 g | +4 |
| 2 g xylose | | |
| 2 g Na₂CO₃ | | |
| EXAMPLE III-11 | | |
| 2 g Hydrolyzed Vegetable Protein | 0.4 g | +3 |
| 2 g xylose | | |
| 2 g Na₂CO₃ | | |
| EXAMPLE III-12 | | |
| 2 g Thiamine Na | 0.4 g | +2 |
| 2 g xylose | | |
| 2 g Na₂CO₁₃ | | |
| EXAMPLE III-13 | | |
| 2 g VEGAMINE ® 128 | 0.6 g | +5 |
| 2 g Fructose | | |
| 2 g Na₂CO₃ | | |
| EXAMPLE III-14 | | |
| 2 g lysine | 0.45 g | +5 |
| 2 g xylose | | |
| 2 g Na₂CO₃ | | |
| 1 g KOLLIDON ® 25 (BASF) | | |
| Registered trademark for | | |
| (Polyvinyl Pyrrolidone | | |
| manufactured by BASF) | | |
| EXAMPLE III-15 | | |
| 2 g lysine | 0.45 g | +5 |
| 2 g Fructose | | |
| 2 g Na₂CO₃ | | |
| 1 g KOLLIDONE ® 25 (PVP) | | |

The polyvinyl pyrrolidone as shown in Examples III-14 and III-15 increase the browning intensity of the browning mixes.

| SAMPLE COMPOSITION | AMOUNT ADDED | DEGREE OF BROWNING (SCALED FROM 1 to 5) |
|---|---|---|
| EXAMPLE III-16 | | |
| 2 g lysine | 0.4 g | +2.5 |
| 3 g glucose | | |
| 3 g Na₂CO₃ | | |
| EXAMPLE III-17 | | |
| 2 g VEGAMINE ® 128 | 0.4 g | +1 |
| 2 g glucose | | |
| 3 g Na₂CO₃ | | |
| EXAMPLE III-18 | | |
| 2 g VEGAMINE ® 128 | 0.4 g | +1 |
| 3 g Fructose | | |
| 3 g Na₂CO₃ | | |
| EXAMPLE III-19 | | |
| 2 g VEGAMINE ® 128 | 0.4 g | +1 |
| 3 g Fructose | | |
| 3 g Na₂CO₃ | | |
| 0.5 g CENTROLEX ® 5 | | |
| (Lecithin) | | |

What is claimed is:

1. A process for producing a cooked edibly browned storage-stable fibrous, proteinaceous muscle tissue foodstuff consisting essentially of the steps of:
(a) providing a particulate flowable, flavoring powder consisting essentially of α individually, discretely encapsulated Maillard reaction reagents said encapsulated Maillard reaction reagents being:
(i) at least one encapsulated amino acid;
(ii) at least one encapsulated sugar optionally admixed with at least one Maillard reaction promoter; and, optionally
(iii) at least one encapsulated pH adjustment agent; and, optionally, β, at least one Maillard reaction promoter;
(b) providing an uncooked fibrous, proteinaceous, muscle tissue foodstuff containing more than 50% of water having an outer uncooked foodstuff surface;
(c) placing in intimate contact with at least a major portion of said uncooked foodstuff surface a flavor augmenting, imparting or enhancing quantity of said particulate flowable flavoring powder thereby forming a flavoring powder-coated foodstuff surface; and
(d) exposing the flavoring powder-coated foodstuff surface to microwave radiation for a predetermined controlled period of time;
whereby the resulting product is caused to be edible as a foodstuff and the cooked, fibrous, proteinaceous muscle tissue foodstuff surface is edibly browned.

2. The process of claim 1 wherein the particulate flowable flavoring powder is in the form of a slurry with a solvent composition which is capable of raising the dielectric constant of the foodstuff to be cooked whereby the foodstuff to be cooked is completely cooked and edibly browned in a period of time under 600 seconds.

3. The process of claim 2 wherein the solvent is selected from the group consisting of glycerine, propylene glycol, mixtures of glycerine and propylene glycol, mixtures of glycerine and ethanol, and mixtures of propylene glycol and ethanol.

4. The process of claim 1 wherein the sugar reactant is selected from the group consisting of rhamnose, xylose, arabinose, ribose, fructose and glucose nd the amino acid reactant is selected from the group consisting of lysine, arginine, cysteine, methionine, yeast extract and hydrolyzed vegetable protein.

5. The process of claim 1 wherein one or more of the Maillard reaction reagents is in the form of particles which are reduced in size to pas through a 100 mesh screen prior to being encapsulated.

6. The process of claim 1 wherein encapsulated along with the sugar is a Maillard reaction promoter and wherein the Maillard reaction promoter is polyvinyl pyrrolidone.

7. The process of claim 1 wherein a Maillard reaction promoter is contained in the particulate flowable flavoring powder and the promoter is polyvinyl pyrrolidone.

8. The process of claim 1 wherein the particulate flowable flavoring power is prepared according to a process comprising the steps of:
(i) providing the separate Maillard reaction components:
an amino acid,
a sugar and, optionally,
a pH adjustment agent;
(ii) heating a high melting point normally solid encapsulating material to melt the encapsulating material forming a molten encapsulating agent;
(iii) separately mixing each of said separate Maillard reaction components with discrete individual portions of said molten encapsulating agent thereby forming separate encapsulated Maillard reaction reagent-containing compositions; and
(iv) spray chilling or drum chilling each of the encapsulated Maillard reaction reagent-containing compositions to provide discrete particles of solid Maillard reaction reagent-containing agent.

9. The process according to claim 8 wherein the encapsulating material has a melting point of from 130° F. to 195° F.

10. The process according to claim 8 wherein the encapsulating material is a fat or wax having a melting point in the range of from 130° F. to 195° F.

11. The process according to claim 8 wherein the encapsulating material is at least one hydrogenated partially hydrogenated vegetable oil, stearin, fat glyceride ester or partial ester or an edible wax.

12. The process according to claim 11 wherein encapsulating material is a partially hydrogenated cottonseed oil, a partially hydrogenated soybean oil, partially hydrogenated palm oil, a glyceryl monostearate, a glyceryl monopalmitate, a propylene glyceryl monostearate, a polyglyerol stearate, a polyoxyethylene sorbitol, a fatty acid ester of polyoxyethylene sorbitol a polyglycerol ester of a fatty acid, beeswax or carna wax, paraffin wax or candellila wax.

13. The process of claim 1 wherein the particulate flowable flavoring powder is prepared according to process comprising:
(i) providing the separate Maillard reaction components:
an amino acid;
a sugar and, optionally,
a pH adjustment agent;
(ii) heating a high melting point normally sol encapsulating material and at least one emulsifier to melt the encapsulating material and emulsifier.
(iii) admixing the melted encapsulating material a emulsifier;
(iv) separately mixing each of the Maillard reaction components with a texture conditioning agent form Maillard recation component-texture conditioning agent mixtures;
(v) separately mixing each of the Maillard reaction components with a texture conditioning agent mixtures with discrete individual portions of the molten mixture of encapsulating agent and emulsifier to obtain homogeneous mixtures in the form of emulsions;
(vi) mixing the resulting emulsions; and
(vii) chilling the resulting emulsions to provide discrete particles of solid encapsulated Maillard reaction reagent-containing composition.

14. A process according to claim 13 wherein the texture conditioning agent is a silicon dioxide, powdered cellulose, puffed dextrin, maltodextrin or pregelatinize starch.

15. A process according to claim 13 wherein the emulsifier is at least one mono- or diglyceride of fatty acid.

16. A process according to claim 13 wherein the encapsulating material has a melting point of from 130° to 195° F.

17. A process according to claim 13 wherein the encapsulating material is a fat or wax having a melting point in the range of from 130° F. to 195° F.

18. A process according to claim 13 wherein the resulting emulsions are chilled by spraying the emulsifier into a stream of gas, the gas having a temperature of from 40° F. to 116° F.

19. A process according to claim 18 wherein the spraying is carried out with a centrifugal atomizer.

20. A process according to claim 18 wherein the emulsions are admixed with compressed air and sprayed through a nozzle.

21. A process according to claim 8 wherein the composition is chilled by contact with a surface at a temperature less than the melting point of the encapsulating material to form flakes.

22. A process according to claim 21 wherein the flakes are reduced in size to pass through a No. 10 screen.

* * * * *